United States Patent

Katsura et al.

Patent Number: 5,910,370
Date of Patent: Jun. 8, 1999

[54] POLYMERIC FILM

[75] Inventors: Naomi Katsura, Chiyoda-machi; Hikaru Takeuchi, Ushiku-machi; Yuka Watanabe, Tokyo, all of Japan

[73] Assignee: ICI Americas Inc, Wilmington, Del.

[*] Notice: This patent is subject to a terminal disclaimer.

[21] Appl. No.: 08/759,507

[22] Filed: Dec. 5, 1996

Related U.S. Application Data

[63] Continuation-in-part of application No. 08/560,761, Nov. 21, 1995, Pat. No. 5,667,889.

[30] Foreign Application Priority Data

Nov. 21, 1995 [GB] United Kingdom ............ 9523764

[51] Int. Cl.⁶ ................ B32B 27/40; B32B 9/04; B32B 27/28
[52] U.S. Cl. ............ 428/425.5; 428/352; 428/353; 428/423.1; 428/447
[58] Field of Search .................. 428/451, 447, 428/352, 423.1, 424.2, 424.8, 425.5, 353; 423/412.1, 412.3

[56] References Cited

U.S. PATENT DOCUMENTS

| | | | |
|---|---|---|---|
| 3,023,126 | 2/1962 | Underwood et al. | 427/412.3 |
| 3,552,998 | 1/1971 | Weyna et al. | 427/412.1 |
| 3,707,397 | 12/1972 | Gagnon . | |
| 3,900,616 | 8/1975 | Moore | 427/412.3 |
| 3,966,531 | 6/1976 | Bargain | 427/412.3 |
| 3,997,702 | 12/1976 | Schurb et al. | 428/352 |
| 4,070,224 | 1/1978 | Zemlin et al. | 428/425.5 |
| 4,177,301 | 12/1979 | Smith, Jr. | 427/412.1 |
| 4,332,857 | 6/1982 | Taniyama et al. | 428/412 |
| 4,396,679 | 8/1983 | Gaku et al. | 428/412 |
| 4,430,379 | 2/1984 | Hayakawa et al. | 428/216 |
| 4,617,078 | 10/1986 | Takahashi et al. | 427/407.1 |
| 4,848,348 | 7/1989 | Craighead | 128/639 |
| 5,401,580 | 3/1995 | Meguriya et al. | 427/133 |
| 5,415,935 | 5/1995 | Pankratz | 428/352 |
| 5,492,599 | 2/1996 | Olson et al. | 427/208.8 |
| 5,578,345 | 11/1996 | Moy | 427/333 |
| 5,602,202 | 2/1997 | Groves | 427/208.8 |
| 5,639,546 | 6/1997 | Bilkadi | 428/331 |
| 5,667,886 | 9/1997 | Gough et al. | 427/387 |
| 5,667,889 | 9/1997 | Katsura et al. | 427/207.1 |

FOREIGN PATENT DOCUMENTS 0 331 409 B1  9/1989  European Pat. Off. .
563 704  10/1993  European Pat. Off. .

OTHER PUBLICATIONS

Database WPI, Week 8521, Derwent Publications Ltd., London, GB; AN 85–125523, XP002027588 & JP 60 063 719 A (Richoh KK) abstract Apr. 1985.

Database WPI, Week 8907, Derwent Publications Ltd., London, GB; AN 89–050039, XP002027589 & JP 01 005 838 A (Teijin KK) abstract 1989 (no month).

Primary Examiner—Diana Dudash

[57] ABSTRACT

A polymeric film has a substrate layer having a primer layer of a polymer containing at least one ethylenically unsaturated group, and a silicone resin coating layer on the surface of the primer layer. The substrate is preferably a polyester film. The primer layer polymer is preferably a polyurethane resin. The polymeric film is particularly suitable for use as a release film.

8 Claims, 1 Drawing Sheet

POLYMERIC FILM

This is a continuation-in-part of application Ser. No. 08/560,761 filed on Nov. 21, 1995, now U.S. Pat. No. 5,667,889.

This invention relates to a polymeric film, and in particular to a polymeric film having a primer layer exhibiting improved adhesion to a silicone resin coating layer.

Silicone resins, based on a silicon-oxygen polymer backbone with pendant aliphatic or aromatic carbon side chains, have been used as coating layers on polymeric film for a variety of applications, for example as a release or an adhesive film. In particular, silicone resins have been used as release agents in recent years, and generally confer good release characteristics. For example EP-323063-A discloses an oriented polymeric film having a release layer of a silicone resin and a volatile inhibitor. EP-342826-A and EP-416765-A describe a release film formed from a self-supporting polymeric film substrate and a polyurethane resin containing polydialkylsiloxane. However, with such prior art silicone resin coated films, the adhesion of the silicone layer to the film substrate can be inadequate. Furthermore, the properties achieved, particularly release, are not always sufficient for all applications. Consequently there exists a commercial requirement for a polymeric film having improved adhesion to silicone layers.

We have now devised a polymeric film which reduces or substantially overcomes at least one of the aforementioned problems.

Accordingly, the present invention provides a polymeric film comprising a substrate having on at least one surface thereof, a primer layer formed from a composition comprising a polymer comprising at least one ethylenically unsaturated group, and a silicone resin coating layer on the surface of the primer layer.

The invention further provides a method of producing a polymeric film which comprises forming a film substrate, applying a primer layer composition comprising a polymer comprising at least one ethylenically unsaturated group, to at least one surface of the substrate, and applying a coating layer composition comprising a silicone resin, to the surface of the primer layer.

The substrate is preferably a polymeric film capable of independent existence in the absence of a supporting base.

The substrate to which a primer layer composition is applied may be formed from any suitable film-forming, polymeric material. Thermoplastics materials are preferred, and include a homopolymer or copolymer of a 1-olefin, such as ethylene, propylene and but-1-ene, a polyamide, a polycarbonate, more preferably a polyester, and particularly a synthetic linear polyester which may be obtained by condensing one or more dicarboxylic acids or their lower alkyl (up to 6 carbon atoms) diesters, eg terephthalic acid, isophthalic acid, phthalic acid, 2,5-, 2,6- or 2,7-naphthalenedicarboxylic acid, succinic acid, sebacic acid, adipic acid, azelaic acid, 4,4'-diphenyldicarboxylic acid, hexahydro-terephthalic acid or 1,2-bis-p-carboxyphenoxyethane (optionally with a monocarboxylic acid, such as pivalic acid) with one or more glycols, particularly aliphatic glycols, eg ethylene glycol, 1,3-propanediol, 1,4-butanediol, neopentyl glycol and 1,4-cyclohexanedimethanol. A polyethylene terephthalate and/or polyethylene naphthalate film is preferred. A polyethylene terephthalate film is particularly preferred, especially such a film which has been biaxially oriented by sequential stretching in two mutually perpendicular directions, typically at a temperature in the range from 70 to 125° C., and preferably heat set, typically at a temperature in the range from 150 to 250° C., for example as described in GB-A-838708.

The substrate may also comprise a polyarylether or thio analogue thereof, particularly a polyaryletherketone, polyarylethersulphone, polyaryletheretherketone, polyaryletherethersulphone, or a copolymer or thioanalogue thereof. Examples of these polymers are disclosed in EP-A-1879, EP-A-184458 and U.S. Pat. No. 4,008,203. Blends of these polymers may also be employed. A poly p-phenylene sulphide film is also suitable.

Suitable thermoset resin substrate materials include addition-polymerisation resins, such as acrylics, vinyls, bis-maleimides and unsaturated polyesters, formaldehyde condensate resins such as condensates with urea, melamine or phenols, cyanate resins, isocyanate resins, epoxy resins, functionalised polyesters, polyamides or polyimides.

A film substrate for a polymeric film according to the invention may be unoriented or preferably oriented, for example uniaxially oriented, or more preferably biaxially oriented by drawing in two mutually perpendicular directions in the plane of the film to achieve a satisfactory combination of mechanical and physical properties. Formation of the film may be effected by any process known in the art for producing a polymeric film, for example a tubular or a flat film process.

In a tubular process simultaneous biaxial orientation may be effected by extruding a thermoplastics polymeric tube which is subsequently quenched, reheated and then expanded by internal gas pressure to induce transverse orientation, and withdrawn at a rate which will induce longitudinal orientation.

In the preferred flat film process a film-forming polymer is extruded through a slot die and rapidly quenched upon a chilled casting surface (drum) to ensure that the polymer is quenched to the amorphous state. Orientation is then effected by stretching the quenched extrudate in at least one direction at a temperature above the glass transition temperature of the polymer. Sequential orientation may be effected by stretching a flat, quenched extrudate firstly in one direction, usually the longitudinal direction, ie the forward direction through the film stretching machine, and then in the transverse direction. Forward stretching of the extrudate is conventionally effected over a set of rotating rolls or between two pairs of nip rolls, transverse stretching then being effected in a stenter apparatus. Stretching is effected to an extent determined by the nature of the film-forming polymer, for example a polyester is usually stretched so that the dimension of the oriented polyester film is from 2.5 to 4.5 its original dimension in the, or each, direction of stretching.

A stretched film may be, and preferably is, dimensionally stabilised by heat-setting under dimensional restraint at a temperature above the glass transition temperature of the film-forming polymer but below the melting temperature thereof, to induce crystallisation of the polymer.

In one embodiment of the invention the polymeric film is transparent, exhibiting high optical clarity and low haze, preferably having a wide angle haze, being measured according to the standard ASTM D 1003-61, of <8%, more preferably <6%, particularly <5%, and especially <3%, preferably for a 75 $\mu$m thick film. The aforementioned optical characteristics can be suitably achieved by having little or no particulate additive present in the substrate. The substrate may contain relatively small quantities of filler material, for example in the range from 5 to 3000 ppm, preferably 50 to 2000 ppm, and more preferably 100 to 1000 ppm. Suitable fillers include inorganic materials such as silica, china clay, calcium carbonate, and organic materials such as silicone resin particles. Spherical monodisperse fillers may be employed. The substrate may contain filler due to the normal practice of using reclaimed film in the film manufacturing process.

However, in an alternative embodiment of the invention the polymeric film is opaque, which is defined as a film exhibiting a Transmission Optical Density (Sakura Densitometer; type PDA 65; transmission mode) of from 0.75 to 1.75, and particularly of from 1.2 to 1.5, preferably for a 150 μm thick film. The polymeric film is conveniently rendered opaque by incorporating into the synthetic polymer of the substrate layer, an effective amount of an opacifying agent. However, in a preferred embodiment of the invention the opaque substrate layer is voided, ie comprises a cellular structure containing at least a proportion of discrete, closed cells. It is therefore preferred to incorporate into the substrate polymer an effective amount of an agent which is capable of generating an opaque, voided substrate layer structure. Suitable voiding agents, which also confer opacity, include an incompatible resin filler, a particulate inorganic filler or a mixture of two or more such fillers.

By an "incompatible resin" is meant a resin which either does not melt, or which is substantially immiscible with the substrate polymer, at the highest temperature encountered during extrusion and fabrication of the layer. Such resins include polyamides and olefin polymers, particularly a homo- or co-polymer of a mono-alpha-olefin containing up to 6 carbon atoms in its molecule, for incorporation into polyester films, or polyesters of the kind hereinbefore described for incorporation into polyolefin films.

Particulate inorganic fillers suitable for generating an opaque, voided substrate layer include conventional inorganic pigments and fillers, and particularly metal or metalloid oxides, such as alumina, silica and titania, and alkaline metal salts, such as the carbonates and sulphates of calcium and barium. Barium sulphate is a particularly preferred filler which also functions as a voiding agent.

Non-voiding particulate inorganic fillers may also be added to the film-forming polymeric substrate layer.

Suitable voiding and/or non-voiding fillers may be homogeneous and consist essentially of a single filler material or compound, such as titanium dioxide or barium sulphate alone. Alternatively, at least a proportion of the filler may be heterogeneous, the primary filler material being associated with an additional modifying component. For example, the primary filler particle may be treated with a surface modifier, such as a pigment, soap, surfactant coupling agent or other modifier to promote or alter the degree to which the filler is compatible with the substrate polymer.

Production of a substrate layer having satisfactory degrees of opacity and preferably voiding requires that the filler should be finely-divided, and the average particle size thereof is preferably in the range from 0.1 to 10 μm, more preferably 0.15 to 3 μm, and particularly 0.2 to 0.75 μm.

Incorporation of the opacifying/voiding agent into the substrate layer polymer may be effected by conventional techniques, for example by mixing with the monomeric reactants from which the polymer is derived, by dry blending with the polymer in granular or chip form prior to formation of a film therefrom, or by using masterbatching technology.

The amount of filler, particularly of barium sulphate, incorporated into the substrate layer polymer is preferably in the range from 5 to 50 weight %, relative to the weight of the polymer. Particularly satisfactory levels of opacity and gloss are achieved when the concentration of filler is in the range from 8 to 30, more preferably 15 to 20 weight %, relative to the weight of the substrate layer polymer.

The primer layer composition, and subsequent primer layer, comprises at least one polymer comprising at least one ethylenically unsaturated group, preferably a vinyl group. Suitable polymeric materials include unsaturated polyurethane resins, unsaturated polyesters, epoxy-acrylate resins, functionalised polyolefins such as maleinised polybutadiene, polybutadiene and butadiene copolymers such as styrene/butadiene copolymers and carboxy modified styrene/butadiene copolymers, and mixtures thereof. The polymeric material of the primer layer is preferably a styrene/butadiene copolymer, more preferably a polyurethane resin, and particularly a mixture thereof.

The preferred polyurethane resin component of the primer layer preferably contains little or no silicone material, and more preferably is the reaction product of, inter alia, an organic isocyanate, a polyol, and optionally an additional monomer. The ethylenically unsaturated group may be provided by any one or more of the starting components of the polyurethane resin.

The use of the word "polyurethane" is intended to cover materials which may be regarded as urethane oligomers, which only form "true" polyurethanes when cured. The molecular weight of the polyurethane resin is preferably in the range from 4,000 to 100,000, more preferably 5,000 to 50,000, and particularly 6,000 to 20,000.

The organic isocyanate component of the polyurethane resin may be an aliphatic, cycloaliphatic, araliphatic or aromatic isocyanate. Examples of suitable polyisocyanates include ethylene diisocyanate, 1,6-hexamethylene diisocyanate, isophorone diisocyanate, cyclohexane-1,4-diisocyanate, 4-4'-dicyclohexylmethane diisocyanate, p-xylylene diisocyanate, 1,4-phenylene diisocyanate, 2,4-toluene diisocyanate, 2,6-toluene diisocyanate, 4,4'-diphenylmethane diisocyanate, 2,4'-diphenylmethane diisocyanate, polymethylene polyphenyl polyisocyanates and 1,5-naphthylene diisocyanate. Mixtures of polyisocyanates may be used and also polyisocyanates which have been modified by the introduction of urethane, allophanate, urea, biuret, carbodiimide, uretonimine or isocyanurate residues.

The polyol component of the polyurethane resin may be a member of any of the chemical classes of polyols used or proposed to be used in polyurethane formulations. For example, the polyol, which is preferably polymeric, may be a polyester, polyesteramide, polyether, polythioether, polyacetal, polyolefin, or polycarbonate. A polyester, particularly an aromatic polyester, is preferred. The molecular weight of the polyol is preferably in the range from 700 to 3000. In one embodiment of the invention the polyol contains an ethylenically unsaturated group. Suitable polyols include an unsaturated polyester polyol, or a polybutadiene polyol.

The additional monomer preferably contains an ethylenically unsaturated group, and more preferably a vinyl group. The monomer is preferably an acrylate monomer, such as a hydroxyalkyl acrylate and/or methacrylate, eg 2-hydroxyethyl and/or 2-hydroxypropyl acrylate and/or methacrylate; or particularly an epoxy-containing acrylate such as glycidyl acrylate, glycidyl methacrylate and/or allyl glycidyl ether. The monomer preferably comprises the ethylenically unsaturated group in the polymerised state.

If desired, a catalyst for urethane formation, such as dibutyltin dilaurate and/or stannous octoate may be used to assist formation of the polyurethane resin, and a non-reactive solvent may be added before or after formation of the medium to control viscosity. Suitable non-reactive solvents which may be used include acetone, methylethylketone, dimethylformamide, ethylene carbonate, propylene carbonate, diglyme, N-methylpyrrolidone, ethyl acetate, ethylene and propylene glycol diacetates, alkyl ethers of ethylene and propylene glycol monoacetates, toluene, xylene and sterically hindered alcohols such as t-butanol and diacetone alcohol. The preferred solvents are water-miscible solvents such as N-methylpyrrolidone, dimethyl sulphoxide and dialkyl ethers of glycol acetates or mixtures of N-methylpyrrolidone and methyl ethyl ketone.

A polyfunctional active hydrogen-containing chain extender may be employed, is preferably water-soluble, and water itself may be effective. Other suitable extenders include a polyol, an amino alcohol, ammonia, a carboxylic acid, a primary or secondary aliphatic, alicyclic, aromatic, araliphatic or heterocyclic amine especially a diamine, hydrazine or a substituted hydrazine.

Examples of suitable chain extenders useful herein include dimethylolpropionic acid, ethylene diamine, diethylene triamine, triethylene tetramine, propylene diamine, butylene diamine, hexamethylene diamine, cyclohexylene diamine, piperazine, 2-methyl piperazine, phenylene diamine, tolylene diamine, xylylene diamine, tris (2-aminoethyl) amine, 3,3'-dinitrobenzidine, 4,4'-methylenebis(2-chloroaniline), 3,3'-dichloro-4,4'-bi-phenyl diamine, 2,6-diaminopyridine, 4,4'-diaminodiphenylmethane, methane diamine, m-xylene diamine, isophorone diamine, and adducts of diethylene triamine with acrylate or its hydrolysed products. Also materials such as hydrazine, azines such as acetone azine, substituted hydrazines such as, for example, dimethyl hydrazine, 1,6-hexamethylene-bis-hydrazine, carbodihydrazine, hydrazides of dicarboxylic acids and sulfonic acids such as adipic acid mono- or dihydrazide, oxalic acid dihydrazide, isophthalic acid dihydrazide, tartaric acid dihydrazide, 1,3-phenylene disulfonic acid dihydrazide, omega-amino-caproic acid dihydrazide, hydrazides made by reacting lactones with hydrazines such as gamma-hydroxylbutyric hydrazide, bis-semi-carbazide, bis-hydrazide carbonic esters of glycols such as any of the glycols mentioned above.

Where the chain extender is other than water, for example a carboxylic acid, diamine or hydrazine, it may be added to the aqueous dispersion of polyurethane resin or, alternatively, it may already be present in the aqueous medium when the resin is dispersed therein.

The amount of polymer, preferably polyurethane, comprising at least one ethylenically unsaturated group, present in the primer layer is preferably greater than 50, more preferably in the range from 60 to 99, particularly 70 to 97, and especially 85 to 95 weight %, relative to the total weight of the layer.

In one embodiment of the invention, the primer layer composition, and subsequent primer layer, comprises a mixture of the polyurethane resin described herein and a styrene/butadiene copolymer, preferably a carboxy modified styrene/butadiene copolymer. The amount of styrene/butadiene copolymer present in the primer layer is preferably in the range from 0 to 40, more preferably 5 to 30, and particularly 10 to 20 weight %, relative to the total weight of the layer.

In a preferred embodiment of the invention, the primer layer coating composition additionally comprises a, preferably low molecular weight, more preferably non-silicone containing, cross-linking agent. The cross-linking agent is suitably an organic material, preferably a monomeric and/or oligomeric species, and particularly monomeric, prior to formation of the primer layer. The molecular weight of the cross-linking agent is preferably less than 2000, more preferably less than 1500, especially less than 1000, and particularly in the range from 250 to 500. Suitable cross-linking agents may comprise alkyd resins, amine derivatives such as hexamethoxymethyl melamine, and/or condensation products of an amine, eg melamine, diazine, urea, cyclic ethylene urea, cyclic propylene urea, thiourea, cyclic ethylene thiourea, aziridines, alkyl melamines, aryl melamines, benzo guanamines, guanamines, alkyl guanamines and aryl guanamines, with an aldehyde, eg formaldehyde. A preferred cross-linking agent is the condensation product of melamine with formaldehyde. The condensation product may optionally be alkoxylated. A catalyst is also preferably employed to facilitate cross-linking action of the cross-linking agent. Preferred catalysts for cross-linking melamine formaldehyde include ammonium chloride, ammonium nitrate, ammonium thiocyanate, ammonium dihydrogen phosphate, diammonium hydrogen phosphate, para toluene sulphonic acid, sulphuric acid, maleic acid stabilised by reaction with a base, ammonium para toluene sulphonate and morpholinium para toluene sulphonate.

The cross-linking agent preferably exhibits at least tri-functionality (ie three functional groups) to promote intermolecular cross-linking with the functional groups present in the primer layer polymer, and to improve adhesion of the primer layer to the surface of the underlying substrate layer.

The amount of cross-linking agent present in the primer layer is preferably in the range from 1 to 40, more preferably 3 to 30, and particularly 5 to 15 weight %, relative to the total weight of the layer. Thus, in a preferred embodiment of the invention the primer layer is cross-linked, ie contains cured polymer, preferably polyurethane, whilst still comprising ethylenically unsaturated groups.

If desired, the primer layer composition may additionally comprise a surfactant to promote spreading thereof when applied to a film substrate.

The primer layer composition, preferably in the form of an aqueous dispersion, may be applied to the substrate film surface by conventional coating techniques. The applied medium, generally having a solids content in the range from 0.3 to 20, preferably 0.5 to 10, and particularly 1 to 3 weight %, is subsequently dried to remove the dispersant and also to effect preferred cross-linking of the layer. Drying may occur by conventional techniques, for example by passing the coated film through a hot air oven. Drying may be effected during normal post-formation film-treatments, such as heat-setting.

The primer layer composition may be applied to an already oriented film substrate. However, application of the primer medium is preferably effected before or during any stretching operation. In particular, it is preferred according to this invention that the primer layer composition should be applied to the film between the two stages (longitudinal and transverse) of a biaxial stretching operation. Such a sequence of stretching and coating is especially preferred for the production of linear polyester films, such as polyethylene terephthalate films, which are preferably firstly stretched in the longitudinal direction over a series of rotating rollers, coated with the primer layer composition and then stretched transversely in a stenter oven, preferably followed by heat-setting.

The silicone resin component of the coating layer composition preferably comprises polysiloxane, more preferably polydialkylsiloxane, and may be, for example a silanol and/or hydrogen terminated and/or in-chain polydialkylsiloxane, preferably terminated polydimethylsiloxane, or an organomodified siloxane comprising a terminal functional group such as a reactive vinyl, hexenyl, hydrogen, hydroxyl, epoxy, mercaptan, acryloyl, and/or acryloylamide group. The silicone resin may be cured by visible, ultra-violet, or electron beam radiation, by heat, and/or by the use of a catalyst.

Cross-linking of the silicone resin may occur by the condensation cure reaction between Si—OH and Si—H groups, preferably in the presence of an organotin or organozinc catalyst, or in the preferred route, by the addition cure reaction between Si-vinyl (ie —CH=CH$_2$) and Si—H groups, preferably by the application of heat, and more preferably in the presence of a platinum complex catalyst. Other silicone cross-linking reactions which are preferably based on ultra-violet and/or electron beam radiation, include the reaction of a mercaptan siloxane and vinyl siloxane, acryloyl siloxane, acryloylamide siloxane, epoxy siloxane, and siloxane (or silicone polymer) and acrylic and/or methacrylic monomer, preferably containing an epoxy group. One or more of the aforementioned reactive groups may be present on the same silicone chain, prior to cross-linking, ie the cross-linking reaction involves both intra- and inter-chain silicone reactions. In a preferred embodiment of the invention, different reactive groups are present on different silicone chains, ie the cross-linking reaction primarily involves inter-chain silicone reactions. In a particularly preferred embodiment of the invention, the coating layer composition comprises a relatively high molecular weight silicone, preferably polydimethylsiloxane, polymer containing vinyl groups, preferably of 50 to 800, more preferably 80 to 400, and particularly 100 to 200 monomer units; and a relatively low molecular weight Si—H containing silicone polymer, preferably of 5 to 40, more preferably 5 to 30, and particularly 5 to 20 monomer units. The ratio of high to low molecular weight silicone polymers present in the coating layer composition is preferably such that the ratio of vinyl groups to Si—H groups is in the range from 0.2 to 5:1, more preferably 0.4 to 2.5:1, and particularly 0.6 to 1.5:1.

In a preferred embodiment of the invention, the silicone resin component of the coating layer reacts chemically with the primer layer, preferably forming cross-links by means of the ethylenically unsaturated groups present in the primer layer polymer, reacting with functional groups, preferably Si—H, present on the silicone resin.

The silicone resin coating layer composition, preferably in the form of an aqueous dispersion, may be applied on to the surface of a primer layer coated substrate by conventional coating techniques. The applied medium, generally having a solids content in the range from 1 to 20, preferably 1.5 to 10, and particularly 2 to 5 weight %, is subsequently dried to remove the dispersant and also to effect preferred cross-linking of the layer. Drying may be effected by conventional techniques, for example by passing the coated film through a hot air oven at a temperature in the range from 50 to 220° C.

The reverse surface of a polymeric film according to the invention, ie remote from the silicone resin coating layer, may be untreated or may have thereon a functional layer, such as the primer layer described herein or an alternative primer layer, a sealable layer, or an antistatic layer.

The polymeric films of the invention may conveniently contain any of the agents conventionally employed in the manufacture of polymeric films. Thus, agents such as dyes, pigments, lubricants, anti-oxidants, antistatic agents, surface active agents, gloss-improvers, prodegradants, fire-retardants, and ultra-violet light stabilisers may be incorporated in the substrate and/or primer layer and/or coating layer, as appropriate.

The polymeric films may vary in thickness depending on the intended application, but preferably have a total thickness in the range from 5 to 350, more preferably 10 to 200 μm, and particularly 50 to 150 μm. The dry thickness of the primer layer is desirably within a range of from 0.002 to 10, preferably 0.005 to 1 μm, and more preferably 0.01 to 0.1 μm. The dry thickness of the silicone resin coating layer is preferably within a range of from 0.01 to 20, and more preferably 0.02 to 2 μm.

The primer layer described herein has excellent adherence to the underlying substrate, and to the overlying silicone resin coating layer, which can be used as an adhesive layer, or preferably as a release layer. A polymeric film according to the present invention, having a silicone resin release layer provides low coefficients of friction, good wear resistance, and offers effective release from adhesives. Such release films are of general applicability and may be employed, inter alia, in the production of moulded articles from curable resins, as release tapes, for example for asphalt roofing materials, as labels, as thermal transfer printing donor, or preferably receiver, sheets, as release materials in the electronics and printing industries, as a release separator for a dermal patch, and as a release separator for ceramics casting and polyvinyl chloride casting.

BRIEF DESCRIPTION OF THE DRAWING

The invention is illustrated by reference to the accompanying drawing in which.

Figure 1:
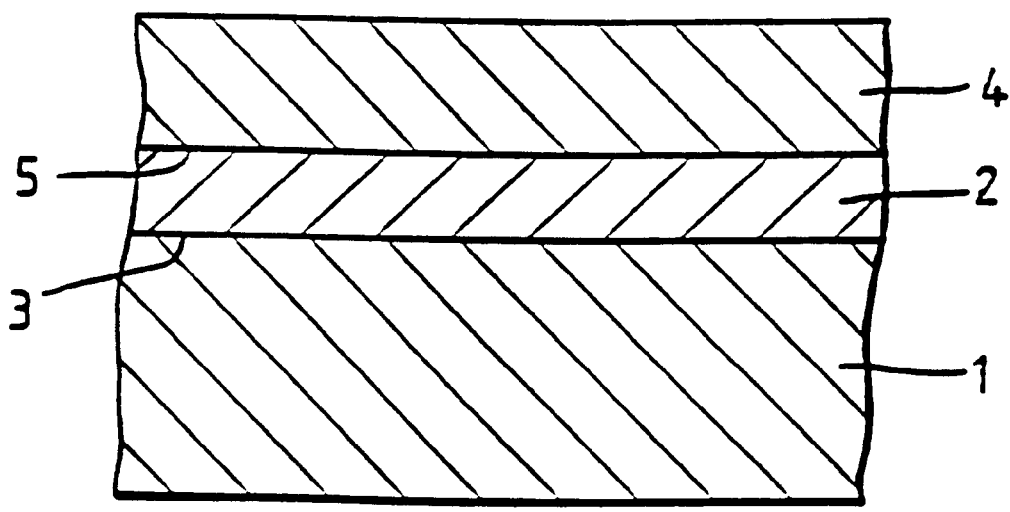
FIG. 1 is a schematic sectional elevation, not to scale, of a polymeric film comprising a substrate layer (1) having a primer layer (2) bonded to one surface (3) of the substrate, and a coating layer (4) bonded to the surface (5) of the primer layer (2).

The invention is further illustrated by reference to the following examples.

EXAMPLE 1

A molten web of polyethylene terephthalate was extruded in a conventional manner from a slot die on to the polished surface of a cooled rotating drum upon which the web was quenched to below the glass transition temperature of the polymer to provide an amorphous film. The quenched film was then reheated and drawn about 3.5 times its original length in the longitudinal direction at a temperature of about 80° C. The monoaxially oriented polyethylene terephthalate substrate film was coated on one side with a primer layer coating composition comprising the following ingredients:

| | |
|---|---:|
| Neorad R-440 | 68 ml |
| (40% w/w aqueous dispersion of polyurethane acrylate, supplied by Zeneca Resins) | |
| Cymel 350 | 27 ml |
| (10% w/w aqueous solution of melamine formaldehyde) | |
| Ammonium nitrate | 3 ml |
| (10% w/w aqueous solution) | |
| Synperonic NP10 | 8 ml |
| (10% w/w aqueous solution of nonyl phenol ethoxylate, supplied by ICI) | |
| Demineralised water | 2394 ml |

The primer layer coated film was passed into a stenter oven, where the film was stretched in the sideways direction to approximately 3.5 times its original dimensions. The coated biaxially stretched film was heat set at a temperature of about 220° C. by conventional means. Final film thickness was 75 μm. The dry coat weight of the primer layer was approximately 0.16 mgdm$^{-2}$, and the thickness of the primer layer was approximately 0.016 μm.

The surface of the primer layer was coated, using a No 3 Meyer bar, with a coating layer composition comprising the following ingredients:

| | |
|---|---|
| Syloff 7198 (40% w/w aqueous dispersion of high molecular weight silicone polymer containing Si-vinyl groups, and low molecular weight silicone polymer containing Si—H groups, supplied by Dow Corning) | 200 ml |
| Syloff 7199 (40% w/w aqueous dispersion of high molecular weight silicone polymer containing Si-vinyl groups, and platinum complex catalyst, supplied by Dow Corning) | 200 ml |
| Synperonic NP10 (10% w/w aqueous solution of nonyl phenol ethoxylate, supplied by ICI) | 50 ml |
| Demineralised water | 2050 ml |

The silicone resin coating layer was dried in an oven at 150° C.

"Permacel J-LAR" adhesive tape was pressed, by using a thumb, on to the surface of the silicone resin coating layer using uniform pressure. The degree of release was measured by peeling apart each sample using an 'Instron'A0533 Tensometer at a peel speed of 200 mm min$^{-1}$. The peeled off adhesive tape was then pressed on to a new sheet of uncoated polyethylene terephthalate film and the degree of release measured again. Low release values in the second release (or transfer) test is an indication of unwanted loss of the silicone resin to the adhesive tape during the first release test.

The results are given in Table 1.

EXAMPLE 2

This is a comparative Example not according to the invention.

The procedure of Example 1 was repeated except that the coating layer composition was applied to an uncoated polyethylene terephthalate film, ie no primer layer was used. The results are given in Table 1.

TABLE 1

| | Peel Strength (g/25 mm (Nm-1)) | |
|---|---|---|
| Example | Release Test | Transfer Test |
| 1 | 7 (3) | 610 (240) |
| 2 (comparative) | 5 (2) | 8 (3) |

EXAMPLE 3

The procedure of Example 1 was repeated except that the coating layer composition comprised a 3% w/w in toluene of silicone material SD7333 (supplied by Dow Corning) together with SRX212 (1% by weight, relative to the silicone, of platinum catalyst, supplied by Dow Corning). The silicone resin coating layer was cured by heating at 120° C. for 30 seconds. The film was stored at 25° C., 60% relative humidity for 1 month and then subjected to a "rubbing off" test, whereby a finger was uniformly rubbed 10 times over the surface of the silicone resin coating layer. There was no indication of any removal of the silicone resin (tested by overwriting the rubbed area with a marker pen).

EXAMPLE 4

The procedure of Example 3 was repeated except that the coating layer composition comprised silicone material SD7229 (supplied by Dow Corning) instead of SD7333. There was no indication of any removal of the silicone resin in the "rubbing off" test.

EXAMPLE 5

This is a comparative Example not according to the invention.

The procedure of Example 3 was repeated except that the coating layer composition was applied to an uncoated polyethylene terephthalate film, ie no primer layer was used. Significant amounts of the silicone resin were removed in the "rubbing off" test (shown by ink from the marker pen adhering to the rubbed area).

EXAMPLE 6

The procedure of Example 3 was repeated except that the coating layer composition comprised 20 grams of UV9300 (silicone oligomer comprising polymethyl cycloaliphatic epoxy siloxane and polymethyl dimethyl siloxane, supplied by Toshiba-GE Silicone), 0.4 grams of UV9310C (onium salt photoinitiator, supplied by Toshiba-GE Silicone), and 80 grams of isopropyl alcohol. The silicone resin coating layer was dried in an oven at 80° C. for 30 seconds, and then cured by dosing with a Fusion H lamp of micro-wave type with a 120 watt output, under a curing speed of 10 meters per minute. There was no indication of any removal of the silicone resin in the "rubbing off" test.

EXAMPLE 7

The procedure of Example 3 was repeated except that the coating layer composition comprised 20 grams of BY24-551A (silicone oligomer comprising polymethyl mercaptan siloxane and polymethyl dimethyl siloxane, supplied by Toray Dow Corning Silicone), 6 grams of BY24-551 B (cross-linker comprising polymethyl vinyl siloxane and polymethyl dimethyl siloxane, with photoinitiator of platinum salt, supplied by Toray Dow Corning Silicone), 20 grams of n-hexane, 20 grams of n-heptane, and 40 grams of methyl ethyl ketone. The silicone resin coating layer was dried in an oven at 80° C. for 30 seconds, and then cured by dosing with a Fusion H lamp of micro-wave type with a 120 watt output, under a curing speed of 10 meters per minute. There was no indication of any removal of the silicone resin in the "rubbing off" test.

EXAMPLE 8

The procedure of Example 3 was repeated except that the coating layer composition comprised 10 grams of SYMAC US352 (30% w/w methyl ethyl ketone solution of silicone grafted acrylic polymer, supplied by Toa-Gosei), 3 grams of ARONIX M210 (100% wt bifunctional acrylate, bisphenol A type epoxy acrylate modified with ethylene oxide, supplied by Toa-Gosei), and 90 grams of methyl ethyl ketone. The silicone resin coating layer was dried in an oven at 140° C. for 20 seconds, and then cured by dosing with an electron beam for 5 Mrad. There was no indication of any removal of the silicone resin in the "rubbing off" test.

EXAMPLE 9

The procedure of Example 3 was repeated except that the coating layer composition comprised 20 grams of X-62-

7200 (acryloyl silicone oligomer, supplied by Shin-Etsu Chemicals), 20 grams of n-hexane, 20 grams of octane, and 40 grams of methyl ethyl ketone. The silicone resin coating layer was dried in an oven at 120° C. for 20 seconds, and then cured by dosing with an electron beam for 5 Mrad. There was no indication of any removal of the silicone resin in the "rubbing off" test.

EXAMPLE 10

The procedure of Example 1 was repeated except that polyethylene naphthalate film was used instead of polyethylene terephthalate film. The same filming conditions described in Example 1 were used except that drawing in the longitudinal direction was carried out at 130° C.

The coating layer composition, applied to the primer layer, comprised 3% w/w in toluene/n-hexane (70/30 wt/wt) of silicone material KS830E (supplied by Shin-Etsu Chemicals), and CAT-PL-50T (1.5% by weight, relative to the silicone, of platinum catalyst, supplied by Shin-Etsu Chemicals). The silicone resin coating layer was cured by heating at 140° C. for 30 seconds. There was no indication of any removal of the silicone resin in the "rubbing off" test.

EXAMPLE 11

This is a comparative Example not according to the invention.

The procedure of Example 10 was repeated except that the coating layer composition was applied to an uncoated polyethylene naphthalate film, ie no primer layer was used. Significant amounts of the silicone resin were removed in the "rubbing off" test (shown by ink from the marker pen adhering to the rubbed area).

The above results illustrate that the primer layer provides improved adhesion to the silicone resin coating layer, which exhibits good release properties.

We claim:

1. A polymeric film comprising a substrate having on at least one surface thereof, a primer layer formed from a composition comprising a polyurethane resin formed from the reaction product of an organic isocyanate and a polyol with the proviso the resin contains at least one ethylenically unsaturated group, and a silicone resin coating layer on the surface of the primer layer.

2. A polymeric film according to claim 1 wherein the polyurethane resin comprises an acrylic or methacrylic monomer comprising an ethylenically unsaturated group.

3. A polymeric film according to claim 1 wherein the polyurethane resin comprises a polyester polyol.

4. A polymeric film according to claim 1 wherein the primer layer comprises greater than 50 weight % of a polymer comprising at least one ethylenically unsaturated group, relative to the total weight of the layer.

5. A polymeric film according to claim 1 wherein the primer layer composition additionally comprises a cross-linking agent.

6. A polymeric film according to claim 5 wherein the primer layer comprises in the range from 1 to 40 weight % of cross-linking agent, relative to the total weight of the layer.

7. A polymeric film according to claim 1 wherein the coating layer comprises a cured silicone resin.

8. A polymeric film according to claim 1 wherein the coating layer has release properties.

* * * * *